(12) United States Patent
Picken et al.

(10) Patent No.: US 6,523,887 B1
(45) Date of Patent: Feb. 25, 2003

(54) MODULAR ROOF AND HEADLINER ASSEMBLY

(75) Inventors: Alan D. Picken, Milford, MI (US); Normand R. Marceau, Fenton, MI (US); Clarence P. Lipke, Fenton, MI (US); Wolfgang K. Rohn, Newmarket (CA)

(73) Assignee: Magna Interior Systems Inc., Aurora (CA)

( * ) Notice: Subject to any disclaimer, the term of this patent is extended or adjusted under 35 U.S.C. 154(b) by 0 days.

(21) Appl. No.: 09/721,684

(22) Filed: Nov. 24, 2000

Related U.S. Application Data

(60) Provisional application No. 60/167,278, filed on Nov. 24, 1999.

(51) Int. Cl.[7] .............................................. B62D 25/06
(52) U.S. Cl. ..................................... 296/214; 280/730.2
(58) Field of Search .................. 296/214; 280/730.2, 280/730.1, 728.2

(56) References Cited

U.S. PATENT DOCUMENTS

| | | | |
|---|---|---|---|
| 4,782,679 A | 11/1988 | Bogel ............................. 72/57 |
| 5,205,187 A | 4/1993 | Ebbinghaus ................. 74/567 |
| 5,259,268 A | 11/1993 | Ebbinghaus et al. .......... 74/567 |
| 5,308,112 A | 5/1994 | Hill et al. ................ 280/730 A |
| 5,403,049 A | 4/1995 | Ebbinghaus ................. 293/133 |
| 5,561,902 A | 10/1996 | Jacobs et al. ................ 29/897.2 |
| 5,605,346 A | 2/1997 | Cheung et al. .......... 280/728.2 |
| 5,632,508 A | 5/1997 | Jacobs et al. ................ 280/781 |
| 5,718,048 A | 2/1998 | Horton et al. ............. 29/897.2 |
| 5,775,726 A * | 7/1998 | Timothy et al. ......... 280/730.1 |
| 5,791,683 A * | 8/1998 | Shibata et al. ........... 280/730.1 |
| 5,794,398 A | 8/1998 | Kaehler et al. ............. 52/653.2 |
| 5,823,611 A | 10/1998 | Daniel et al. ................ 296/214 |
| 5,833,304 A * | 11/1998 | Daniel et al. ................ 296/214 |
| 5,899,498 A | 5/1999 | Horton ......................... 280/781 |
| 5,921,576 A | 7/1999 | Sinnhuber ................. 280/730.2 |
| 5,953,945 A | 9/1999 | Horton ............................ 72/58 |
| 5,960,660 A | 10/1999 | Klaas et al. .................... 72/61 |
| 5,988,735 A | 11/1999 | Muller ........................ 296/214 |
| 6,014,879 A | 1/2000 | Jaekel et al. .................... 72/61 |
| 6,065,502 A | 5/2000 | Horton ........................ 138/177 |
| 6,070,902 A * | 6/2000 | Kowalski et al. ......... 280/730.2 |
| 6,079,732 A * | 6/2000 | Nakajima et al. ........ 280/728.2 |
| 6,082,761 A * | 7/2000 | Kato et al. ............... 280/728.2 |
| 6,092,865 A | 7/2000 | Jaekel et al. ................. 296/205 |
| 6,142,506 A | 11/2000 | Patel et al. ............... 280/728.2 |
| 6,142,509 A * | 11/2000 | White et al. ............. 280/728.2 |
| 6,217,061 B1 * | 4/2001 | Harland et al. .......... 280/730.2 |
| 6,257,616 B1 * | 7/2001 | Nowak et al. ........... 280/730.2 |

* cited by examiner

Primary Examiner—D. Glenn Dayoan
Assistant Examiner—Lori L Coletta
(74) Attorney, Agent, or Firm—Clark Hill PLC

(57) ABSTRACT

A modular headliner assembly for an automotive vehicle comprises a planar center support mat adapted for mounting to a roof panel of the vehicle. A perimeter support mat extends outwardly from the outer periphery of the center support mat and is adapted for mounting to the roof panel of the vehicle. The perimeter support mat includes a main portion and an outwardly extending flap portion pivotally connected to the main portion by a living hinge. An airbag module is mounted to an interior surface of the main portion of the perimeter support mat adjacent the flap portion. The airbag module includes an inflatable airbag and an airbag canister for inflating the airbag. The flap portion is movable between a closed position covering the airbag and an open position pivoted away from the airbag providing a passageway for deployment of the airbag through the headliner assembly when inflated by the airbag canister. One or more additional components, such as a grab handle, coat hook, accessory light and speaker are also mounted to the exterior surface of the perimeter support mat.

4 Claims, 5 Drawing Sheets

MODULAR ROOF AND HEADLINER ASSEMBLY

This application claims benefit of Ser. No. 60/167,278 filed Nov. 24, 1999.

BACKGROUND OF THE INVENTION

1) Field of the Invention

The subject invention relates to a modular headliner assembly for a vehicle which incorporates an airbag module.

2) Description of the Related Art

Current trends in automotive vehicle design are to incorporate modular assemblies and subassembly designs. Attaching modular assemblies to the vehicle reduces labor intensive, and ergonomically difficult installations. The modular assemblies also increase vehicle quality and consistency by making the individual component installation much easier. The ease of assembly for a modular component outside the interior of the vehicle minimizes and/or eliminates installation errors.

Headliner assemblies are well known in the industry. However, prior art headliner assemblies are not of a modular design. In addition, the components mounted to or within the prior art headliners, such as an airbag, must be mounted separately from the headliner to the frame of the vehicle.

SUMMARY OF THE INVENTION

The present invention provide a single unit modular headliner assembly for an automotive vehicle comprising a perimeter support mat adapted for mounting to a roof panel of the vehicle. An airbag module is mounted to an interior surface of the perimeter support mat and at least one additional component may also be mounted to an exterior surface of the perimeter support mat. The modular headliner assembly may be completely manufactured and assembly independent from the vehicle and then installed as a single unit within the interior compartment of the vehicle and mounted to the roof panel of the vehicle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
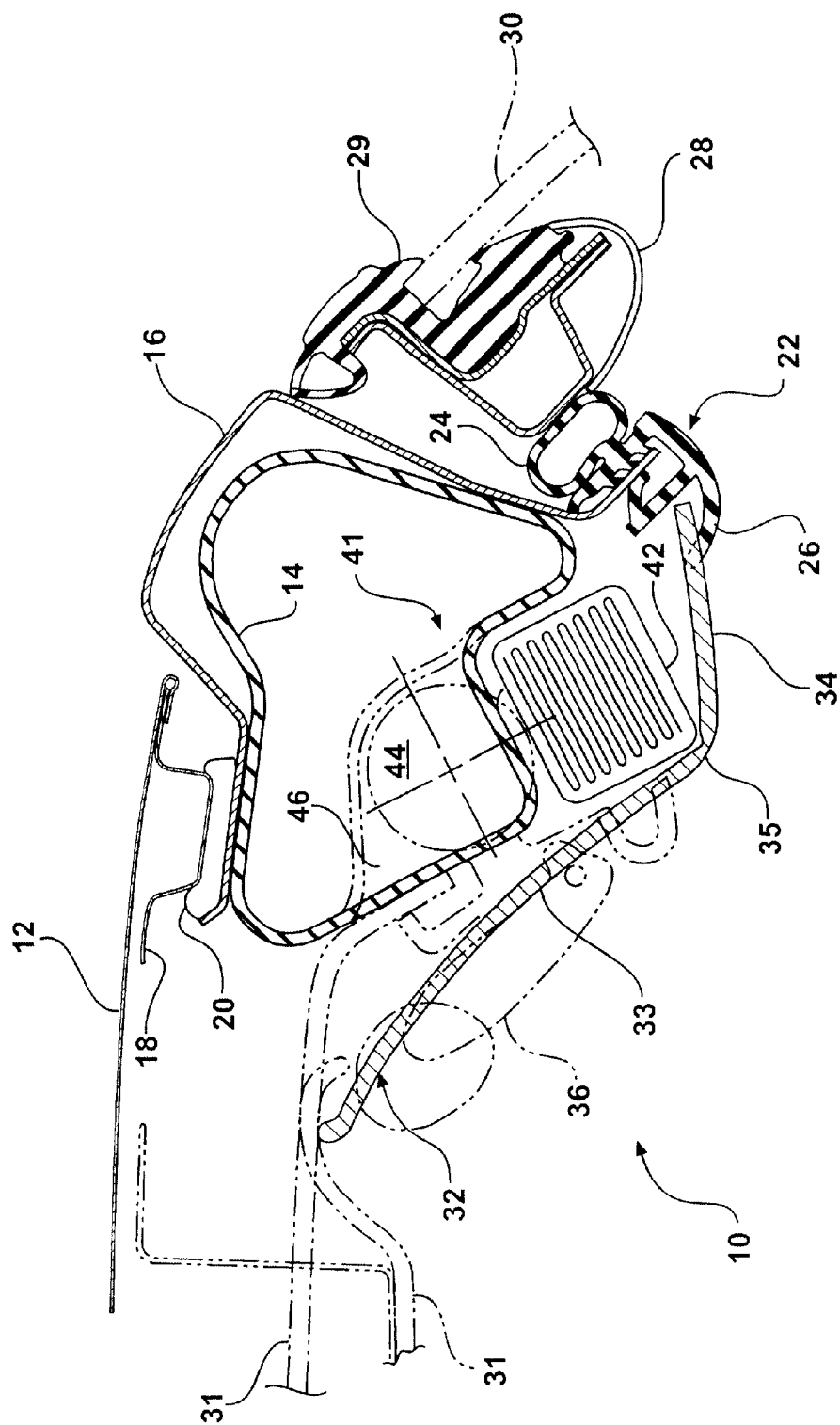
FIG. 1 is a partially cross sectional side view of a headliner assembly incorporating the aspects of the subject invention.

Referring to FIGS. 1 through 4, a headliner assembly is generally shown at 10. The headliner assembly 10 is mounted to a roof panel 12 within an interior of a vehicle. A structural roof rail 14, preferably hydroformed, is affixed to an underside of the roof panel 12 along a longitudinal periphery of the roof panel 12. Hydroforming is a manufacturing process which is done by first inserting a tube into a mold. The tube is then pressurized with fluid which expands the tube conforming the tube to the shape of the mold. Methods of hydroforming are more particularly described in U.S. Pat. Nos. 4,782,679; 5,205,187; 5,259,268; 5,403,049; 5,561,902; 5,632,508; 5,718,048; 5,794,398; 5,899,498; 5,953,945; 5,960,660; 6,014,879 and 6,065,502. U.S. Pat. No. 6,092,865 described the use of hydroformed structures for forming a frame of a vehicle.

Preferably, the structural roof rail 14 is mounted to an exterior flange 16 by way of welds or fasteners. The flange 16 is mounted to the roof panel 12 which in turn mounts the roof rail 14 to the roof panel 12. Specifically, the roof panel 12 includes a structural support beam 18 wherein the flange 16 is mounted to the support beam 18. Preferably, the flange 16 is mounted to the support beam 18 by a structural adhesive 20. The flange 16 at least partially forms an exterior of the vehicle.

A mounting clip 22 is secured to a distal end of the flange 16. The mounting clip 22 includes a bulb seal 24 and an outwardly extending arm 26. A door frame 28, which includes a window 30, engages and seals with the bulb seal 24 when the door is closed as is known in the art. A door seal 29 is also provided on the door frame 28 for sealing engagement with the flange 16.

The headliner assembly 10 of the subject invention is designed to be mounted as a single unit within interior of the vehicle, preferably to the roof panel 12. In particular, the headliner assembly 10 includes a plurality of support mat sections 31, 32, each covered by a trim cover material. The support mat sections 31, 32 are adhered or secured to the roof panel 12 by any known suitable means, such as clips, fasteners or adhesive. The trim cover material is typically a cloth type material having a foam substrate as is commonly known to one skilled in the art.

There is a center support mat 31, having the trim cover material, extending over the majority of the roof panel 12. For illustrative purposes, the center support mat 31 is shown extending at two different locations which correlate to the roof panel 12 with and without a sunroof. There is also a perimeter support mat 32 connected to the center support mat 31 and extending over the hydroformed roof rail 14 and the flange 16. The perimeter support mat 32 includes main portion 33 and an outward extending flap portion 34 which is hingedly, or pivotally, connected to the main portion 33 of the support mat 32. Preferably, the hinged connection is a living hinge 35 wherein the support mat 32 is crimped or otherwise deformed to create the hinge 35.

Figure 5:
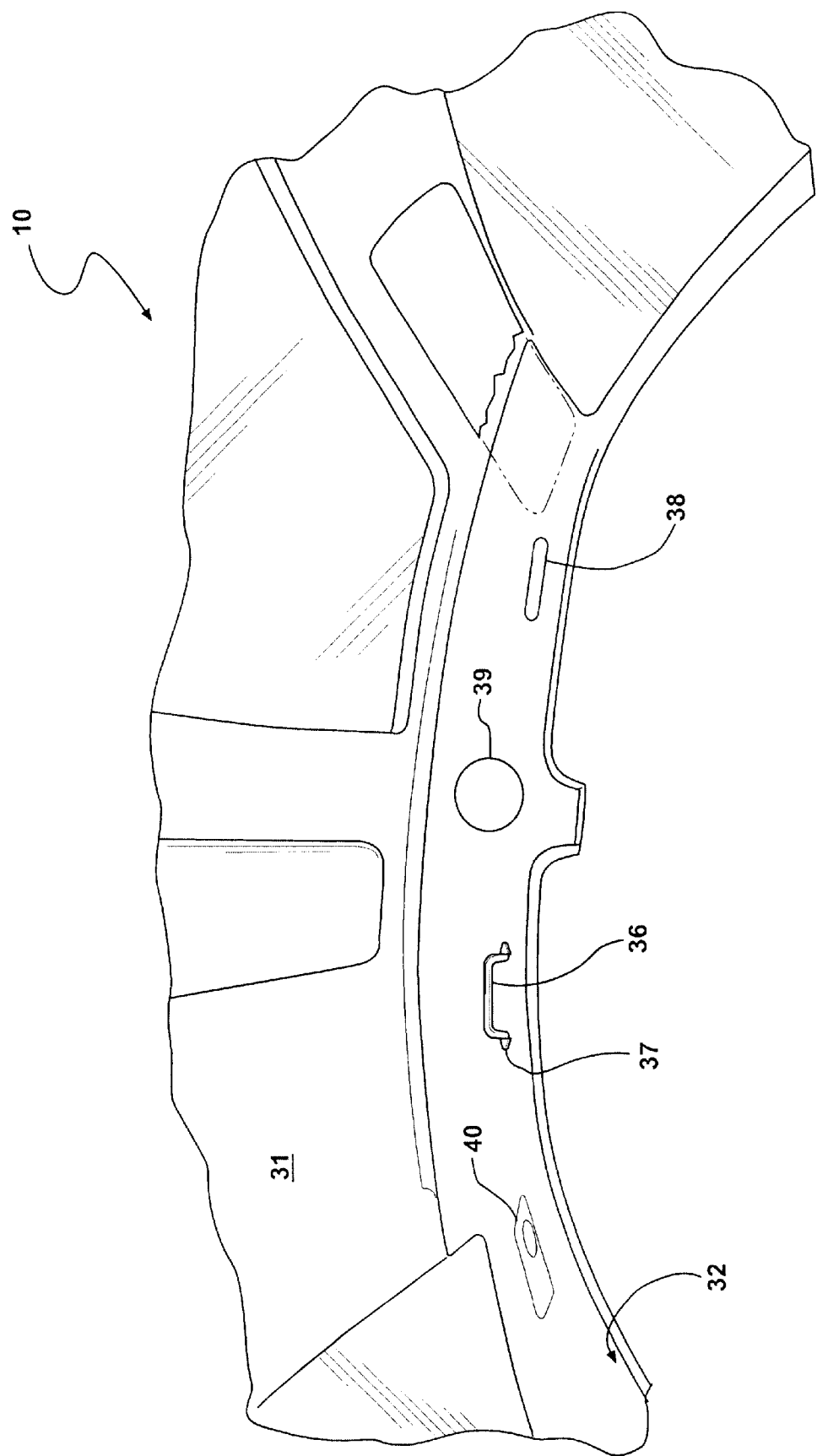
FIG. 5 is a fragmentary interior side view of a vehicle roof incorporating the headliner assembly.

The perimeter support mat 32 has sufficient structural rigidity to support added accessories or components such as grab handles 36 and coat hooks 37. As also shown in FIG. 5, the perimeter support mat 32 may also support accessories or components such as theater lighting 38, reading lights 40, telephone equipment, speakers 39 and the like. The accessories are preferably mounted to an exterior surface of the perimeter support mat 32. The perimeter support mat 32 further supports at least one airbag module 41 mounted to an interior surface thereof. The airbag module 41 includes an inflatable airbag 42 mounted to a suitable airbag canister 44 for inflating the airbag 42. The airbag module 41 is mounted to and supported by the perimeter support mat 32 by clips, fasteners or adhesive, such as structural adhesive tape, with the airbag 42 adjacent the flap portion During installation of the headliner assembly 10, a distal end of the outward flap portion 34 of the perimeter support mat 32 is held in a closed position by the arm 26 of the mounting clip 22. The roof rail 14 includes an integrally formed cavity 46 (best shown in FIG. 4) for receiving and housing the airbag module 41. The hydroformed roof rail 14 can be molded in a variety of shapes which creates a variety of different shaped cavities that can accommodate many sizes, shapes and types of airbag modules 41. As appreciated, the headliner assembly 10 may include more than one airbag 42 or more than one airbag canister 44.

The entire headliner assembly 10, which includes the support mat sections 32, trim cover material, airbag module 41, grab handle 36, theater lights 38, coat hooks 37 and other desired accessories are assembled or manufactured as a single unit outside of the vehicle. The headliner assembly 10 is then installed in a one step operation. This modular design of the headliner assembly 10 allows for easy interchangeability, packaging, and support of various types of airbag modules and other components while at the same time uses parts of the assembly 10 to protect and conceal the airbag 42 and the airbag canister 44.

Figure 2:
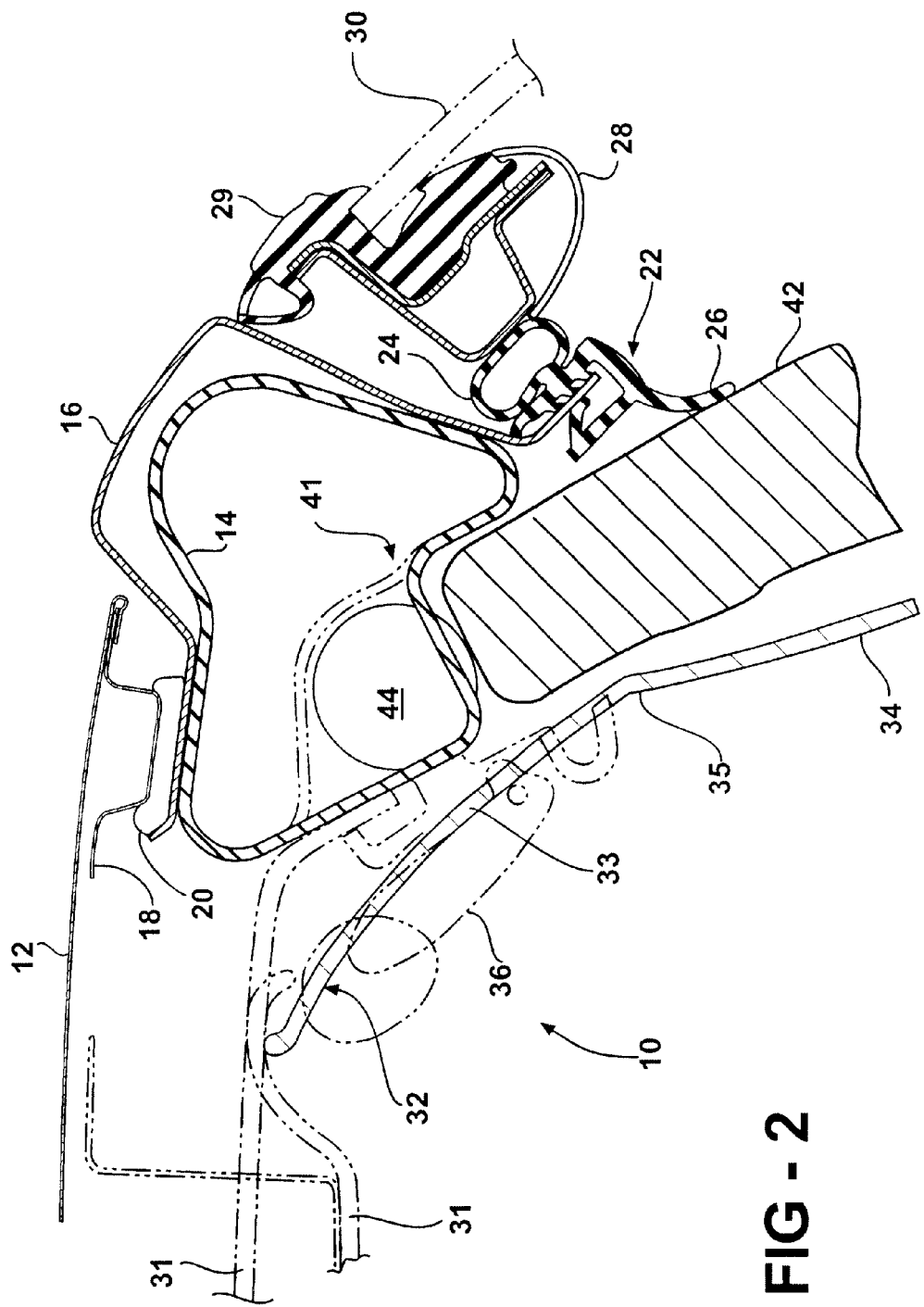
FIG. 2 is a partially cross sectional side view of the headliner assembly with an airbag being deployed.
Figure 3:
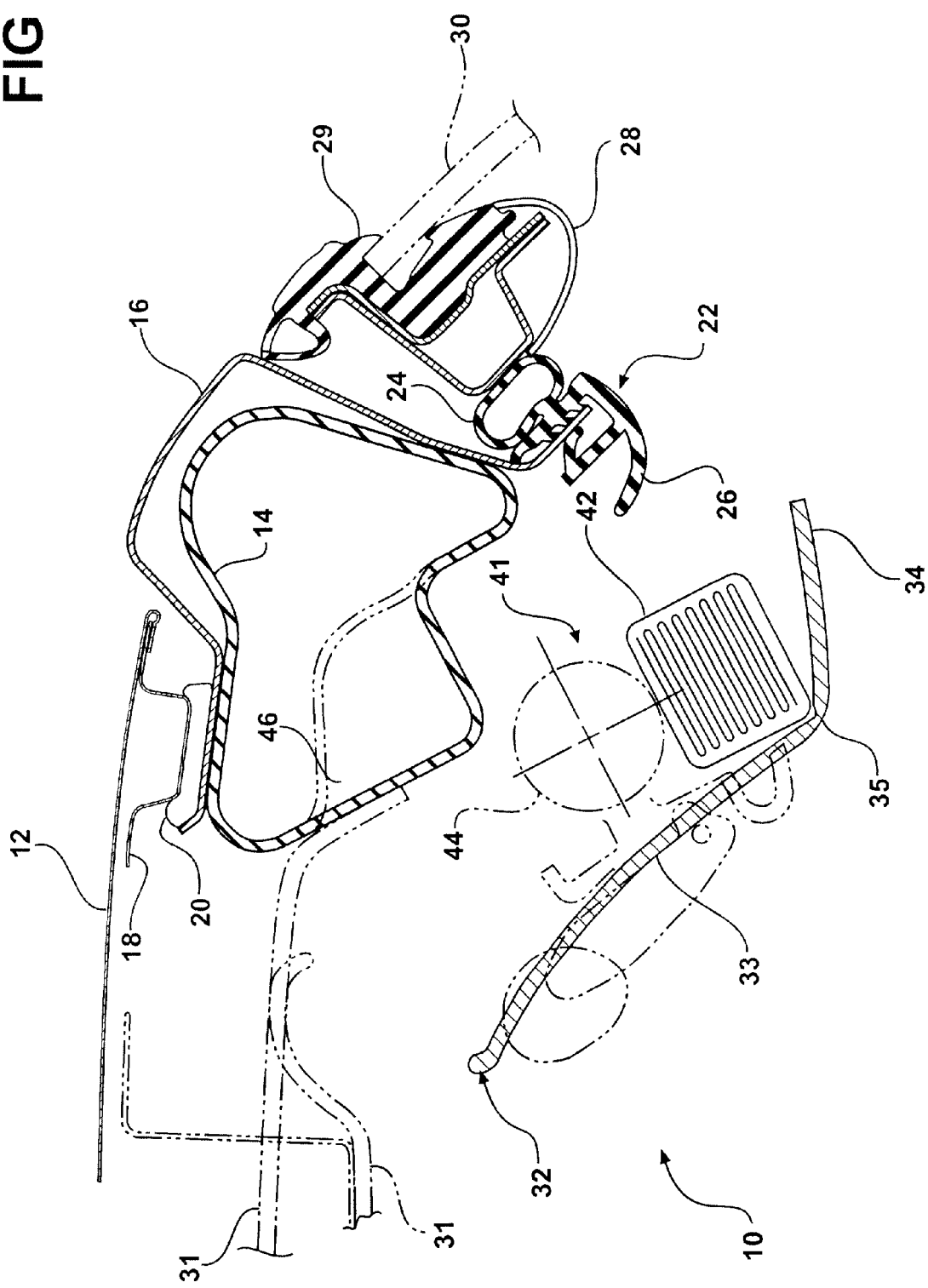
FIG. 3 is a partially cross sectional side view of the headliner assembly in a spaced relationship to a roof panel of a vehicle.
Figure 4:
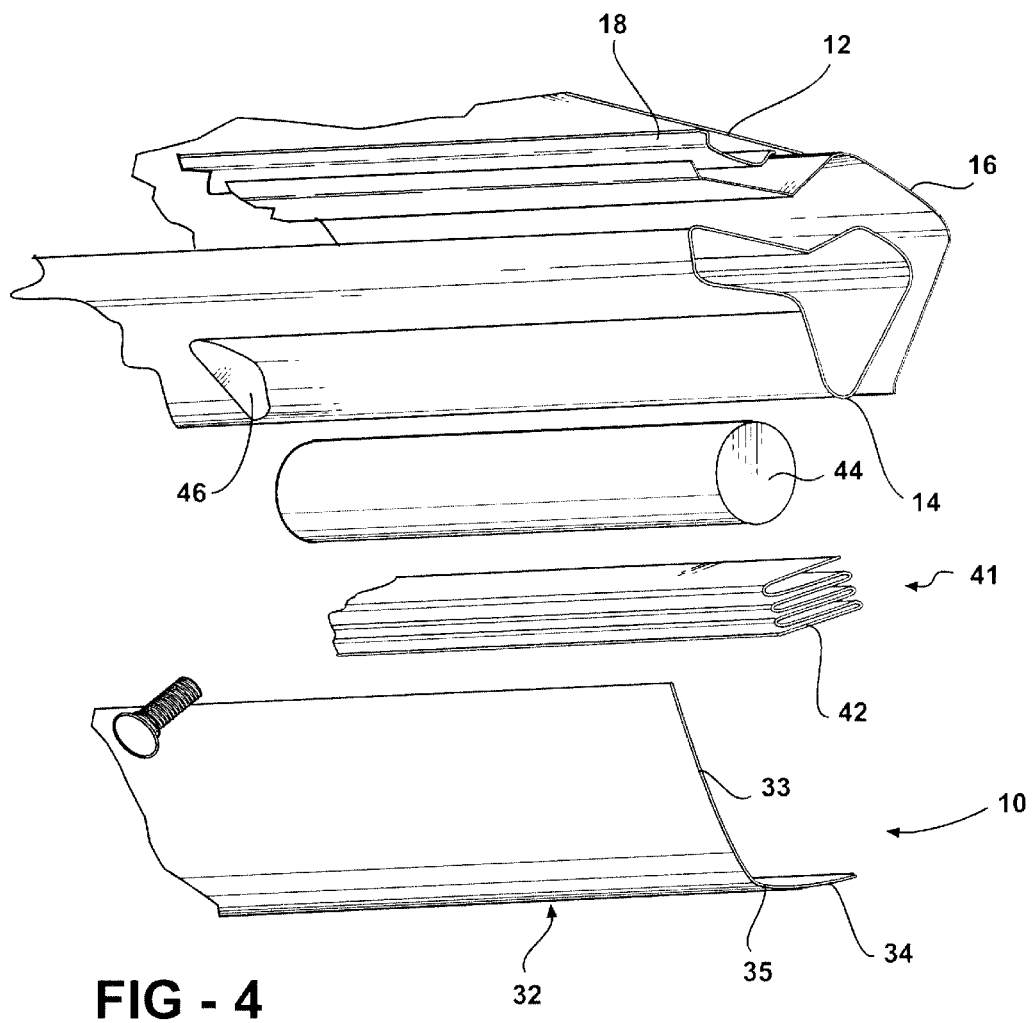
FIG. 4 is an exploded view of the headliner assembly and roof panel.

Referring to FIG. 2, during deployment of the airbag 42, the flap 34 of the perimeter support mat 32 releases from the arm 26 of the mounting clip 22 and at least partially hinges about the living hinge 35 from the closed position, as shown in FIG. 1, to an open position to provide a passageway for the airbag 42 to inflate through the headliner assembly 10, as shown in FIG. 2. The flap 34 does not, however, detach from the support mat 32. After a complete deployment, the perimeter section of the headliner assembly 10 may be removed and easily replaced. In other words, the perimeter support mat 32, associated air bag module 41, grab handle 36 and other accessories can be removed from the interior of the vehicle and another modular headliner assembly 10 can be reinstalled. Accordingly, the modular headliner assembly 10 also reduces the costs of replacement after an airbag deployment.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A modular headliner assembly for an automotive vehicle comprising:

a generally planar center support mat adapted for mounting to a roof panel of the vehicle;

a perimeter support mat removably connected to said center support mat and extending outwardly therefrom;

an airbag module mounted to and supported by an interior surface of said perimeter support mat, said airbag module including an inflatable airbag and an airbag cannister for inflating said airbag;

said perimeter support mat including a main portion for fixedly supporting said airbag module and an outwardly extending flap portion pivotally connected to said main portion and movable between a closed position covering said airbag and an open position pivoted away from said airbag providing a passageway for deployment of said airbag when inflated by said airbag cannister; and at least one additional component mounted to an exterior surface of said perimeter support mat wherein said at least one additional component includes at least one grab handle, light, speaker and coat hook.

2. A modular headliner assembly for an automotive vehicle comprising:

at least one generally planar center support mat adapted for mounting to a roof panel of the vehicle;

at least one perimeter support mat extending outwardly from the outer periphery of said center support mat and adapted for mounting to the roof panel of the vehicle;

said perimeter support mat including a main portion removably connected to the outer periphery of said center support mat and an outwardly extending flap portion pivotally connected to said main portion;

an airbag module mounted to an interior surface of said main portion of said perimeter support mat adjacent said flap portion, said airbag module including an inflatable airbag and an airbag canister for inflating said airbag;

wherein said flap portion is movable between a closed position covering said airbag and an open position pivoted away from said airbag providing a passageway for deployment of said airbag through said headliner assembly when inflated by said airbag canister; and at least one additional component mounted to the exterior surface of one of said center support mat and said perimeter support mat.

3. A modular headliner assembly as set forth in claim 2 wherein said at least one additional component including at least one of a grab handle, light, speaker and coat hook.

4. A modular headliner assembly as set forth in claim 2 wherein said flap portion is pivotally connected to said main portion of said perimeter support mat by a living hinge.

* * * * *